US011074785B2

(12) United States Patent
Meyer

(10) Patent No.: US 11,074,785 B2
(45) Date of Patent: Jul. 27, 2021

(54) GAMING MACHINE HAVING A CHANGEABLE NUMBER OF HELD WILD REELS AND SPECIAL SYMBOLS

(71) Applicant: Aristocrat Technologies Australia Pty Limited, North Ryde (AU)

(72) Inventor: Jason Meyer, Wyoming (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

(21) Appl. No.: 16/141,624

(22) Filed: Sep. 25, 2018

(65) Prior Publication Data

US 2019/0096185 A1 Mar. 28, 2019

(30) Foreign Application Priority Data

Sep. 27, 2017 (AU) ................................ 2017903923
Aug. 16, 2018 (AU) ................................ 2018217284

(51) Int. Cl.

| | |
|---|---|
| ***A63F 9/24*** | (2006.01) |
| ***A63F 11/00*** | (2006.01) |
| ***G06F 13/00*** | (2006.01) |
| ***G06F 17/00*** | (2019.01) |
| ***G07F 17/32*** | (2006.01) |

(52) U.S. Cl.

CPC ...... *G07F 17/3258* (2013.01); *G07F 17/3213* (2013.01); *G07F 17/3267* (2013.01); *G07F 17/3269* (2013.01)

(58) Field of Classification Search

USPC ........................ 463/1, 16, 17, 20, 22, 25, 39
See application file for complete search history.

(56) References Cited

U.S. PATENT DOCUMENTS

| | | | | |
|---|---|---|---|---|
| 9,607,466 B2 * | 3/2017 | Hornik | G07F 17/326 | |
| 2007/0015563 A1 * | 1/2007 | Yanagi | G07F 17/3211 | 463/16 |
| 2007/0178958 A1 * | 8/2007 | Inamura | G07F 17/32 | 463/17 |
| 2009/0247275 A1 * | 10/2009 | Pires | G07F 17/3258 | 463/20 |
| 2014/0179402 A1 * | 6/2014 | Delekta | G07F 17/3262 | 463/20 |
| 2015/0018071 A1 * | 1/2015 | Elias | G07F 17/34 | 463/20 |
| 2015/0363998 A1 * | 12/2015 | Comeau | G07F 17/3265 | 463/20 |
| 2019/0258382 A1 * | 8/2019 | Clediere | G06F 3/04817 | |

* cited by examiner

*Primary Examiner* — Adetokunbo O Torimiro
(74) *Attorney, Agent, or Firm* — McAndrews, Held & Malloy, Ltd.

(57) ABSTRACT

A gaming machine having a number of reels. Each of the reels includes at least one special symbol that in either in an active state or a normal state. Each of the reels is in either a held state or a symbol collection state indicative of a number of special symbols currently collected. During a game, when the number of special symbols of a reel reaches a predetermined number, the special symbols on the reel are in an active state for a next play of the game. While in the active state, when a special symbol is selected for the reel, the reel is in a held state a subsequent play of the game.

18 Claims, 10 Drawing Sheets

GAMING MACHINE HAVING A CHANGEABLE NUMBER OF HELD WILD REELS AND SPECIAL SYMBOLS

RELATED APPLICATIONS

This application claims priority to Australian Patent Application No. 2018217284, having a filing date of Aug. 16, 2018, which claims priority to Australian Patent Application No. 2017903923, having a filing date of Sep. 27, 2017, both of which are incorporated herein by reference in their entireties.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

A need exists for improved gaming machines having components which enable future play to be influenced by past game outcomes.

BRIEF SUMMARY

In a first aspect, the disclosure provides a gaming machine comprising: a display; a credit mechanism operable to establish credits on the gaming machine; a game play mechanism operable by a player to place a wager from the established credits and initiate play of a game; and a game controller comprising a processor and memory, the memory storing program code, a pay table, reel data defining a plurality of reels, each reel including at least one special symbol which has an active state and a normal state, meters including a credit meter and a win meter, and reel states for each of the plurality of reels, the possible reel states including a held state and symbol collection states indicative of a number of special symbols currently collected in respect of the respective reel, wherein possible values of the symbol collection states range from 0 to a defined number, the game controller configured to conduct a play of the game by: controlling the display to display wild symbols at each symbol display position of each of the plurality reels which is currently in the held state; selecting and displaying symbols for each of the plurality of reels which is not currently in the held state, upon the selected symbols of a reel including one or more special symbols in the normal state, updating the symbol collection state of the respective reel, upon the symbol collection state of a respective reels reaching the defined number, setting each special symbol on the respective reel to be in the active state for at least the next play of the game, upon the selected symbols of a reel including one or more special symbols in the active state, changing display of the reel to display wild symbols at each symbol display position of the respective reel and setting the reel state of the respective reel to be in the held state for at least one subsequent play of the game, evaluating, based on the pay table, the symbols displayed on the reels after any reels have been changed, and making any award due based on the evaluation to the win meter or the credit meter.

In a second aspect, the disclosure provides a method of operating a gaming machine, the gaming machine comprising: a display; a credit mechanism operable to establish credits on the gaming machine; a game play mechanism operable by a player to place a wager from the established credits and initiate play of a game; and a game controller comprising a processor and memory, the memory storing program code, a pay table, reel data defining a plurality of reels, each reel including at least one special symbol which has an active state and a normal state, meters including a credit meter and a win meter, and reel states for each of the plurality of reels, the possible reel states including a held state and symbol collection states indicative of a number of special symbols currently collected in respect of the respective reel, wherein possible values of the symbol collection states range from 0 to a defined number, the method comprising: controlling, by the game controller, the display to display wild symbols at each symbol display position of each of the plurality reels which is currently in the held state; selecting and displaying, by the game controller, symbols for each of the plurality of reels which is not currently in the held state, upon the selected symbols of a reel including one or more special symbols in the normal state, updating, by the game controller, the symbol collection state of the respective reel, upon the symbol collection state of a respective reels reaching the defined number, setting, by the game controller, each special symbol on the respective reel to be in the active state for at least the next play of the game, upon the selected symbols of a reel including one or more special symbols in the active state, changing, by the game controller, display of the reel to display wild symbols at each symbol display position of the respective reel and setting the reel state of the respective reel to be in the held state for at least one subsequent play of the game, evaluating, by the game controller based on the pay table, the symbols displayed on the reels after any reels have been changed, and making, by the game controller, any award due based on the evaluation to the win meter or the credit meter.

In a third aspect, the disclosure provides a gaming machine comprising: a display; a credit mechanism operable to establish credits on the gaming machine; a game play mechanism operable by a player to place a wager from the established credits and initiate play of a game; and a game controller comprising a processor and memory, the memory storing program code, a pay table, reel data defining a plurality of reels, each reel including at least one special symbol, meters including a credit meter and a win meter, and reel states for each of the plurality of reels, the possible reel states including a held state and symbol collection states indicative of a number of special symbols currently collected in respect of the respective reel, wherein possible values of the symbol collection states range from 0 to a defined number, the game controller configured to conduct a play of the game by: determining, prior to selection of symbols, whether to modify individual occurrences of the special symbol to be multiple special symbols, upon the selected symbols of a reel including one or more special symbols in the normal state, updating the symbol collection state of the respective reel, where upon the selected symbols including a multiple special symbol, the counter of the respective reel is updated by the number of the multiple special symbol, randomly determining whether a number of wild symbols corresponding to the number of collected symbols of each reel as defined by their respective symbol collection states is to be added to the respective reel at the symbol display positions, evaluating, based on the pay table, the symbols displayed on the reels after any wild symbols have been added, and making any award due based on the evaluation to the win meter or the credit meter.

In a fourth aspect, the disclosure provides a method of operating a gaming machine, the gaming machine comprising: a display; a credit mechanism operable to establish credits on the gaming machine; a game play mechanism operable by a player to place a wager from the established credits and initiate play of a game; and a game controller comprising a processor and memory, the memory storing program code, a pay table, reel data defining a plurality of reels, each reel including at least one special symbol, meters including a credit meter and a win meter, and reel states for each of the plurality of reels, the possible reel states including a held state and symbol collection states indicative of a number of special symbols currently collected in respect of the respective reel, wherein possible values of the symbol collection states range from 0 to a defined number, the method comprising: determining, prior to selection of symbols, whether to modify individual occurrences of the special symbol to be multiple special symbols, upon the selected symbols of a reel including one or more special symbols in the normal state, updating the symbol collection state of the respective reel, where upon the selected symbols including a multiple special symbol, the counter of the respective reel is updated by the number of the multiple special symbol, randomly determining whether a number of wild symbols corresponding to the number of collected symbols of each reel as defined by their respective symbol collection states is to be added to the respective reel at the symbol display positions, evaluating, based on the pay table, the symbols displayed on the reels after any wild symbols have been added, and making any award due based on the evaluation to the win meter or the credit meter.

In a fifth aspect, the disclosure provides computer program code which when executed implements the above method.

In a sixth aspect, the disclosure provides a tangible computer readable medium comprising the above program code.

BRIEF DESCRIPTION OF SEVERAL VIEWS OF THE DRAWINGS

An exemplary embodiment of the present disclosure will now be described with reference to the accompanying drawings in which.

DETAILED DESCRIPTION

Figure 1:
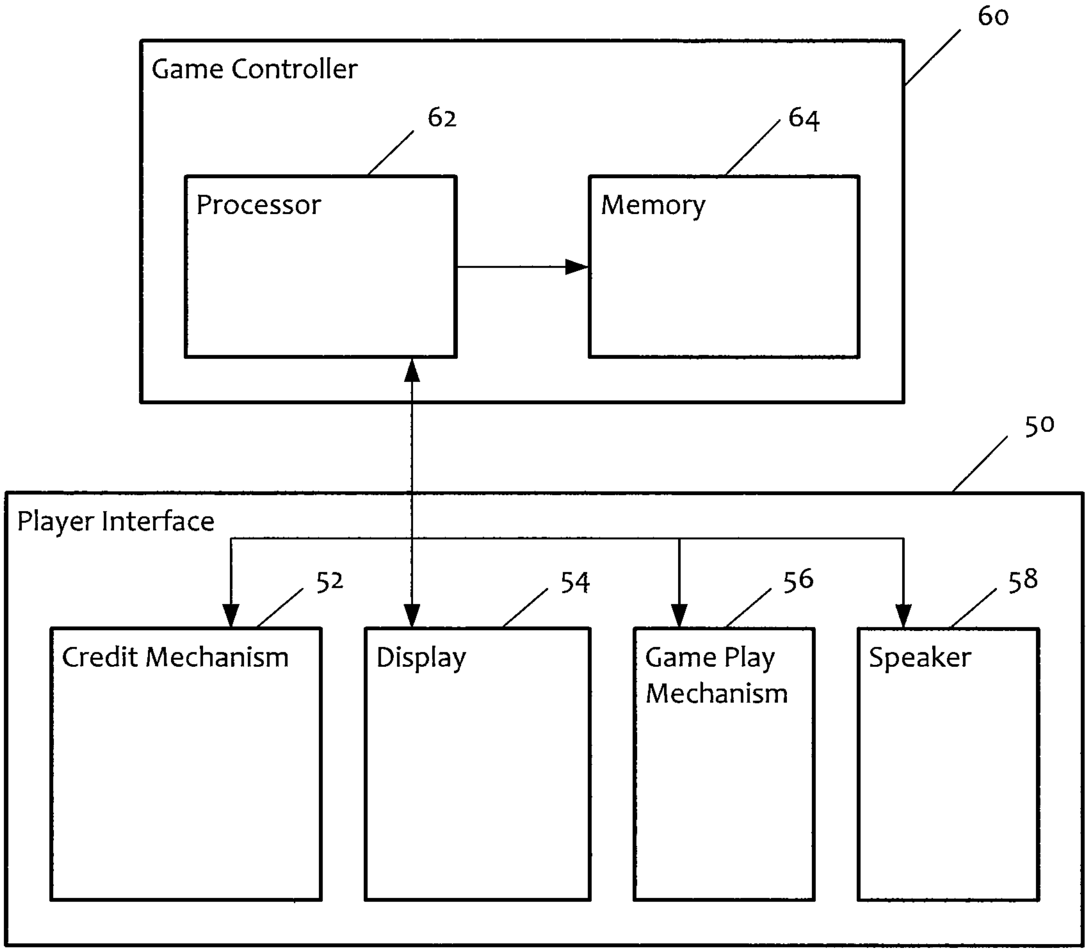
FIG. 1 is a block diagram of the core components of a gaming machine.

Referring to the drawings, there is shown a gaming machine having components that enable the implementation of a game wherein the state of the game can change over time so that a next bought or played game can start from a different starting point relative to a preceding game. The gaming machine is configured with components to change and track the state of symbols and reels responsive to events in the game to enable the state of the game to change over time.

In an embodiment, each reel has at least one special symbol which has an active state and a normal state. If sufficient of symbols in the normal state occur over one or more plays of the game, the state of each special symbol on that reel is changed by the gaming machine to an active state. The gaming machine monitors the symbol collection state of each reel. If the special symbol(s) is in an active state, and the gaming machine selects a special symbol for display, the gaming machine replaces all symbols on that reel with wild symbols. Once all symbols have been turned to wild for a respective reel, that reel is held in a held state for at least one subsequent bought or free game, thus, improving the player's chance of winning in the subsequent held or free game.

In an embodiment, if all of the reels are turned wild, the player wins a jackpot prize.

In an embodiment, there is a chance at the beginning of each spin that all the collected special symbols will be added immediately to the reels, prizes are awarded based on the added symbols and the symbol collection states will be reset for each of the reels.

General Construction of Gaming Machine

The gaming machine can take a number of different forms. In a first form, a standalone gaming machine is provided wherein all or most components required for implementing the game are present in a player operable gaming machine.

In a second form, a distributed architecture is provided wherein some of the components required for implementing the game are present in a player operable gaming machine and some of the components required for implementing the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in standalone gaming machine mode, "thick client" mode or "thin client" mode depending on the game being played, operating conditions, and so on. Other variations will be apparent to persons skilled in the art.

Irrespective of the form, the gaming machine has several core components. At the broadest level, the core components are a player interface 50 and a game controller 60 as illustrated in FIG. 1. The player interface is arranged to enable manual interaction between a player and the gaming system and for this purpose includes the input/output components required for the player to enter instructions to play the game and observe the game outcomes.

Components of the player interface may vary from embodiment to embodiment but will typically include a credit mechanism 52 to enable a player to input credits and receive payouts, one or more displays 54, a game play mechanism 56 including one or more input devices that enable a player to input game play instructions (e.g. to place a wager), and one or more speakers 58.

The game controller 60 is in data communication with the player interface and typically includes a processor 62 that processes the game play instructions in accordance with game play rules and outputs game play outcomes to the display. Typically, the game play rules are stored as program code in a memory 64 but can also be hardwired. Herein the term "processor" is used to refer generically to any device that can process game play instructions in accordance with game play rules and may include: a microprocessor, microcontroller, programmable logic device or other computational device, a general purpose computer (e.g. a PC) or a server. That is a processor may be provided by any suitable logic circuitry for receiving inputs, processing them in accordance with instructions stored in memory and generating outputs (for example on the display). Such processors are sometimes also referred to as central processing units (CPUs). Most processors are general purpose units, however, it is also know to provide a specific purpose processor using an application specific integrated circuit (ASIC) or a field programmable gate array (FPGA).

Figure 2:
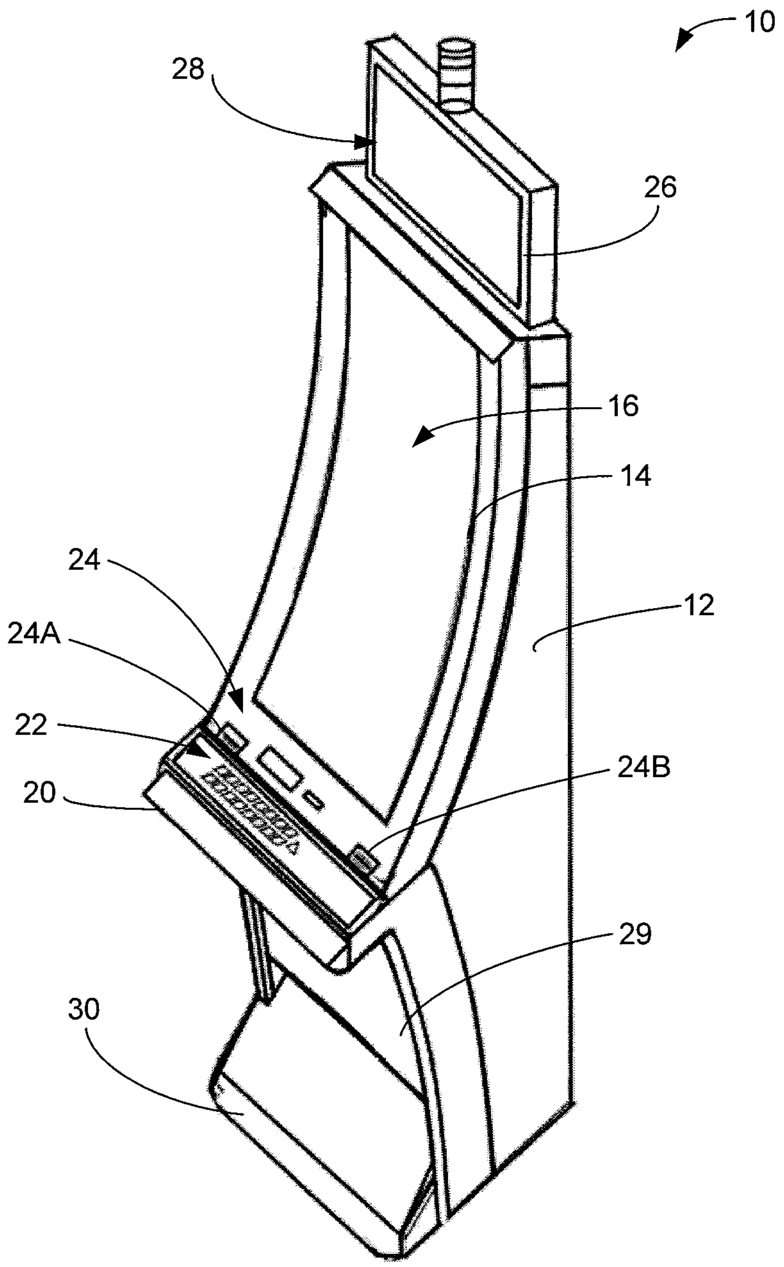
FIG. 2 is a perspective view of a stand alone gaming machine.

A standalone gaming machine 10 is illustrated in FIG. 2. The gaming machine 10 includes a console 12 having a display 14 on which are displayed representations of a game 16 that can be played by a player. A mid-trim 20 of the gaming machine 10 houses a bank of buttons 22 for enabling a player to interact with the gaming machine, in particular during game play. The mid-trim 20 also houses a credit input mechanism 24 which in this example includes a coin input chute 24A and a bill collector 24B. Other credit input mechanisms may also be employed, for example, a card reader for reading a smart card, debit card or credit card. Other gaming machines may configure for ticket in such that they have a ticket reader for reading tickets having a value and crediting the player based on the face value of the ticker. A player marketing module (not shown) having a reading device may also be provided for the purpose of reading a player tracking device, for example as part of a loyalty program. The player tracking device may be in the form of a card, flash drive or any other portable storage medium capable of being read by the reading device. In some embodiments, the player marketing module may provide an additional credit mechanism, either by transferring credits to the gaming machine from credits stored on the player tracking device or by transferring credits from a player account in data communication with the player marketing module that is accessed in response to insertion of the player tracking device.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 2 is in the form of a liquid crystal display. The display 14 may any other suitable video display unit, such as an OLED display. The top box 26 may also include a display, which may be of the same type as the display 14, or of a different type.

Figure 3:
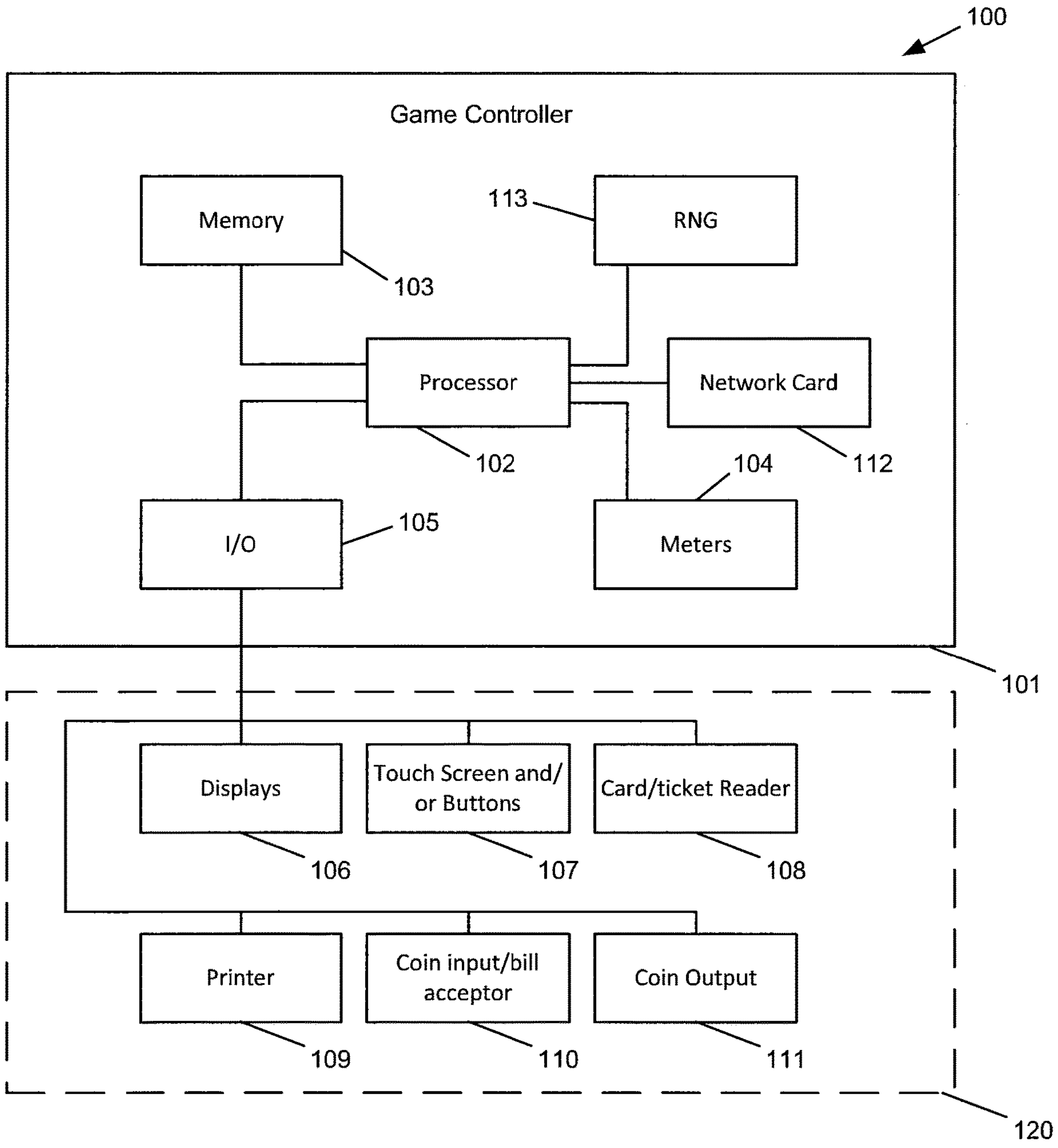
FIG. 3 is a block diagram of the functional components of a gaming machine.

FIG. 3 shows a block diagram of operative components of a typical gaming machine which may be the same as or different to the gaming machine of FIG. 2.

The gaming machine 100 includes a game controller 101 having a processor 102 mounted on a circuit board. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 including one or more displays 106, a touch screen and/or buttons 107 (which provide a game play mechanism), a card and/or ticket reader 108, a printer 109, a bill acceptor and/or coin input mechanism 110 and a coin output mechanism 111. Additional hardware may be included as part of the gaming machine 100, or hardware may be omitted as required for the specific implementation. For example, while buttons or touch screens are typically used in gaming machines to allow a player to place a wager and initiate a play of a game any input device that enables the player to input game play instructions may be used. For example, in some gaming machines a mechanical handle is used to initiate a play of the game. Persons skilled in the art will also appreciate that a touch screen can be used to emulate other input devices, for example, a touch screen can display virtual buttons which a player can "press" by touching the screen where they are displayed.

In addition, the gaming machine 100 may include a communications interface, for example a network card 112. The network card may, for example, send status information, accounting information or other information to a bonus controller, central controller, server or database and receive data or commands from the bonus controller, central controller, server or database. In embodiments employing a player marketing module, communications over a network may be via player marketing module—i.e. the player marketing module may be in data communication with one or more of the above devices and communicate with it on behalf of the gaming machine.

Figure 4:
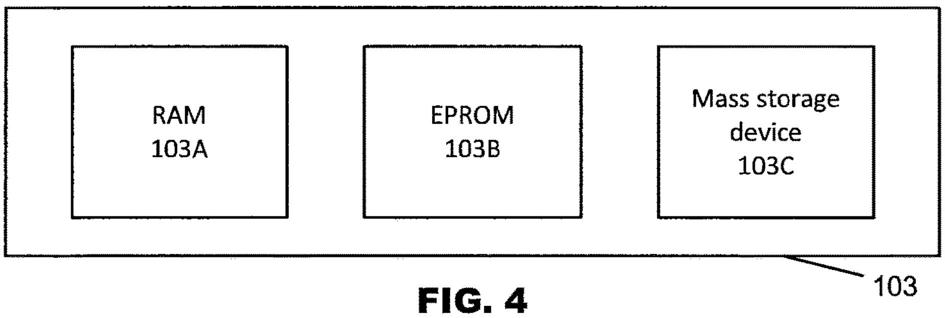
FIG. 4 is a schematic diagram of the functional components of a memory.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices such as one or more displays 106, touch screen and/or buttons 107, card and/or ticket reader 108, printer 109, bill acceptor and/or coin input mechanism 110, and a coin output mechanism 111, to be provided remotely from the game controller 101.

Figure 5:
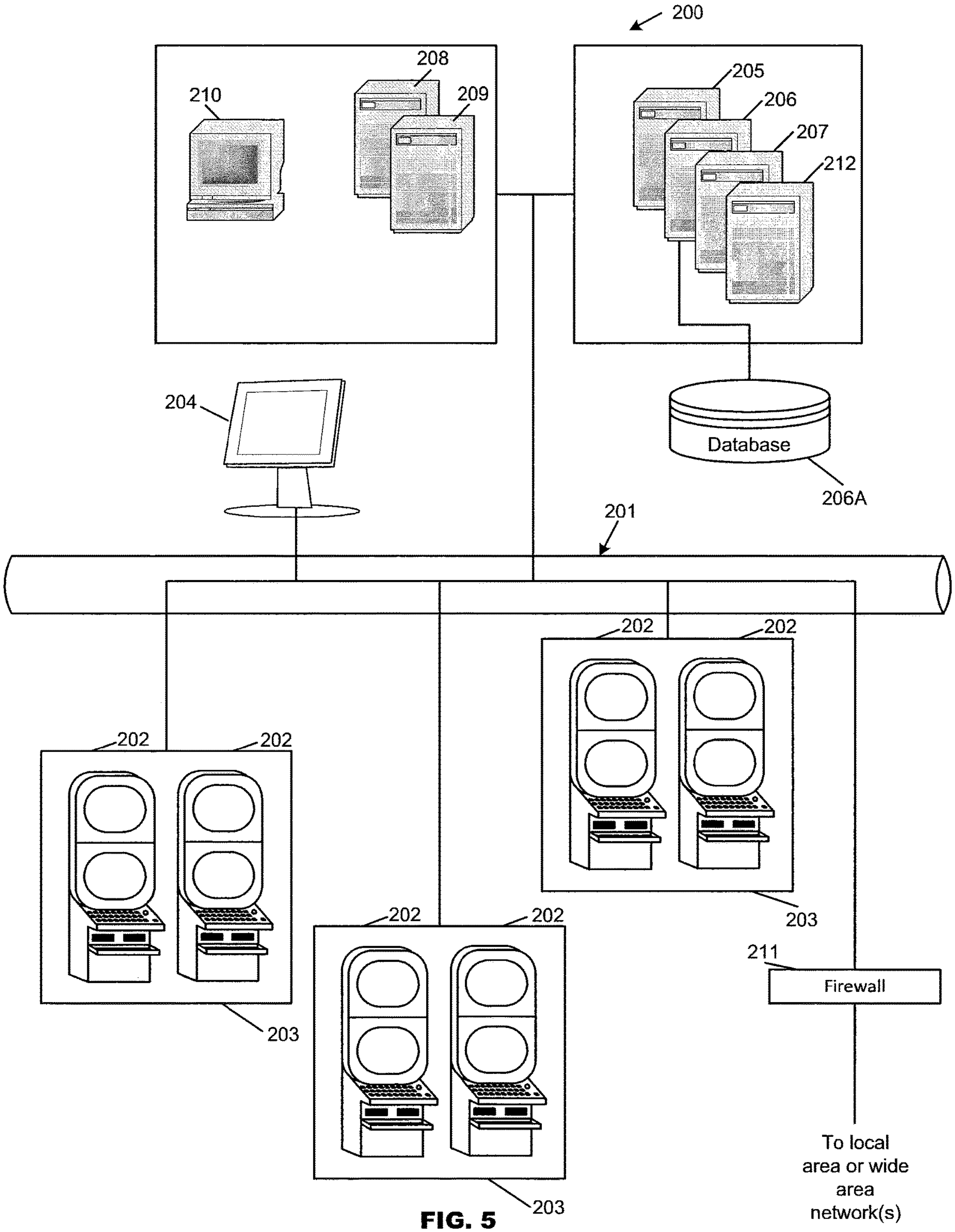
FIG. 5 is a schematic diagram of a network gaming system.

FIG. 5 shows a gaming system 200 in accordance with an alternative embodiment. The gaming system 200 includes a network 201, which for example may be an Ethernet network. Gaming machines 202, shown arranged in three banks 203 of two gaming machines 202 in FIG. 5, are connected to the network 201. The gaming machines 202 provide a player operable interface and may be the same as the gaming machines 10, 100 shown in FIGS. 2 and 3, or may have simplified functionality depending on the requirements for implementing game play. While banks 203 of two gaming machines are illustrated in FIG. 5, banks of one, three or more gaming machines are also envisaged.

One or more displays 204 may also be connected to the network 201. For example, the displays 204 may be associated with one or more banks 203 of gaming machines. The displays 204 may be used to display representations associated with game play on the gaming machines 202, and/or used to display other representations, for example promotional or informational material.

In a thick client embodiment, game server 205 implements part of the game played by a player using a gaming machine 202, and the gaming machine 202 implements part of the game. With this embodiment, as both the game server and the gaming device implement part of the game, they collectively provide a game controller. A database management server 206 may manage storage of game programs and associated data for downloading or access by the gaming machine 202 in a database 206A. Typically, if the gaming system enables players to participate in a Jackpot game, a Jackpot server 207 will be provided to perform accounting functions for the Jackpot game. A loyalty program server 212 may also be provided.

In a thin client embodiment, game server 205 implements most or all of the game played by a player using a gaming machine 202 and the gaming machine 202 essentially provides only the player interface. With this embodiment, the game server 205 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components. Other client/server configurations are possible, and further details of a client/server architecture can be found in WO 2006/052213 and PCT/SE2006/000559, the disclosures of which are incorporated herein by reference.

Servers are also typically provided to assist in the administration of the gaming system 200, including for example a gaming floor management server 208, and a licensing server 209 to monitor the use of licenses relating to particular games. An administrator terminal 210 is provided to allow an administrator to run the network 201 and the devices connected to the network.

The gaming system 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of game servers could be provided to run different games or a single game server may run a plurality of different games as required by the terminals.

Further Detail of the Gaming Machine

The player operates the game play mechanism 56 to specify a wager which will be evaluated for this play of the game and initiates a play of the game. Persons skilled in the art will appreciate that a player's wager can be varied from game to game dependent on player selections. In most spinning reel games, it is typical for the player's wager to be made up of a selection as to how the game outcome will be evaluated by specifying what parts of the game outcome will qualify for winning outcomes and a multiplier that will apply to each winning outcome. For example, a player's wager may be based on how many lines they play in each game—e.g. a minimum of one line up to the maximum number of lines allowed by the game (noting that not all permutations of win lines may be available for selection) and an amount per line—e.g. one, two or five credits. Winning outcomes on an activated win line may be evaluated based on a pay table that specifies the amount awarded for a one credit per line wager multiplied by the amount wagered per line.

Such win lines are typically formed by a combination of symbol display positions, one from each reel, the symbol display positions being located relative to one another such that they form a line.

In many games, the gaming machine may award winning outcomes which are not strictly limited to the lines they have selected, for example, "scatter" pays are awarded independently of a player's selection of pay lines.

Persons skilled in the art, will appreciate that in other embodiments, the player may select a number of reels to play or play a fixed number of reels. Games of this type are marketed under the trade name "Reel Power" by Aristocrat Leisure Industries Pty Ltd and are also known as "ways" to win games. The selection of the reel means that each displayed symbol of the reel can be substituted for a symbol at one or more designated display positions. In other words, all symbols displayed at symbol display positions corresponding to a selected reel can be used to form symbol combinations with symbols displayed at a designated, symbol display positions of the other reels. For example, if there are five reels and three symbol display positions for each reel such that the symbol display positions comprise three rows of five symbol display positions, the symbols displayed in the center row are used for non-selected reels. As a result, the total number of ways to win is determined by multiplying the number of active display positions of each reel, the active display positions being all display positions of each selected reel and the designated display position of the non-selected reels. As a result for five reels and fifteen display positions there are 243 ways to win.

In one embodiment, the display positions of the symbol display are arranged in a rectangular matrix comprising a plurality of columns and a plurality of rows. However, other arrangements are known in the gaming industry and could be employed in embodiments of the disclosure. For example, in some arrangements there are more symbols in some columns than others, such as 3-4-3-4-3 arrangement of seventeen display positions corresponding to respective ones of five reels. In such arrangements, the columns of four symbols can be arranged so that they are off-set or staggered relative to the columns having three symbols so that the middle two symbols in the columns of four symbols share boundaries with two symbols of each neighboring reel.

Figure 6:
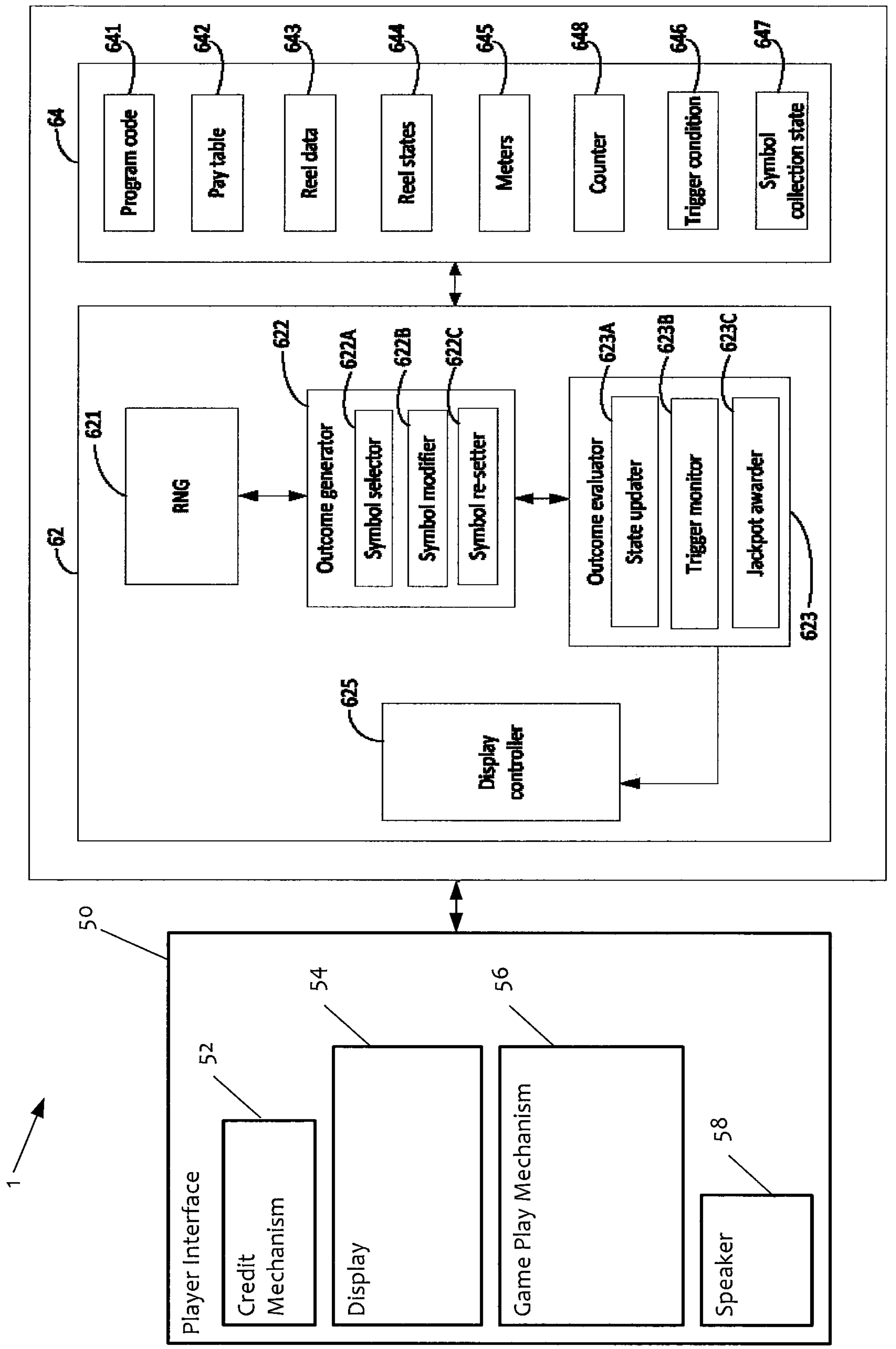
FIG. 6 is a further block diagram of a gaming machine.

In FIG. 6, the processor 62 of game controller 60 of the gaming machine 1 is shown implementing a number of modules based on program code 641 and data stored in memory 64. Persons skilled in the art will appreciate that one or more of the modules could be implemented in some other way, for example by a dedicated circuit.

In the embodiment of FIG. 6, a player places a wager by selecting a number of lines to play and an amount to wager per line. The outcome of a base game is generated by selecting symbols. In this example, by selecting three symbols to display in each of five columns from five reels of symbols corresponding to the respective reels. The symbols are displayed so as to form a matrix of symbol display positions.

In one example, the symbol selector 622A uses random number generator 621 to randomly select a stopping position for each of the five reels specified by reel data 643.

In an example, the outcome evaluator 623 evaluates the selected symbols to determine whether one or more winning symbol combinations can be found on a bought pay line. That is, a pay line which forms part of the player's selection of pay lines. In an example, the outcome evaluator 623 does this by evaluating the symbols from left to right relative to the defined pay lines.

The pay table 642 defines the winning combinations of symbols associated with respective prizes. For example, some prizes may require a player to have five of the same symbol, others may require four of the same symbol, others may require three of the same symbol and others may require two of the same symbol to appear on a winning pay line. The pay table 642 may also define scatter wins which are awarded for a defined number of symbols independently of the position at which the symbols appear.

In the example, each of the reels specified by reel data includes at least one occurrence of a special symbol. In the example in FIGS. 9-11, the special symbol is represented as a stick of dynamite. The special symbol is collected during play as will be described in more detail below. Once sufficient symbols are collected, the state of the symbol changes. In the example, the dynamite symbol changes to a "gold dynamite symbol" to indicate its active state. The dynamite symbol acts as a wild symbol in the evaluation of game outcomes by outcome evaluator 623 using the pay table 642. If an active symbol (e.g. gold dynamite) is selected in the subsequent game, each displayed symbol position for the reel for which it is selected is changed by symbol modifier to a wild symbol, which is in effect, is a further representation of the special symbol. Each reel where all the symbols are changed to wild is held in place for a number of subsequent game rounds under the control of the outcome generator. In the example shown in FIGS. 9-11, three special symbols need to be collected in order for the dynamite symbol to change to the "gold" or "active" state.

Figure 9:
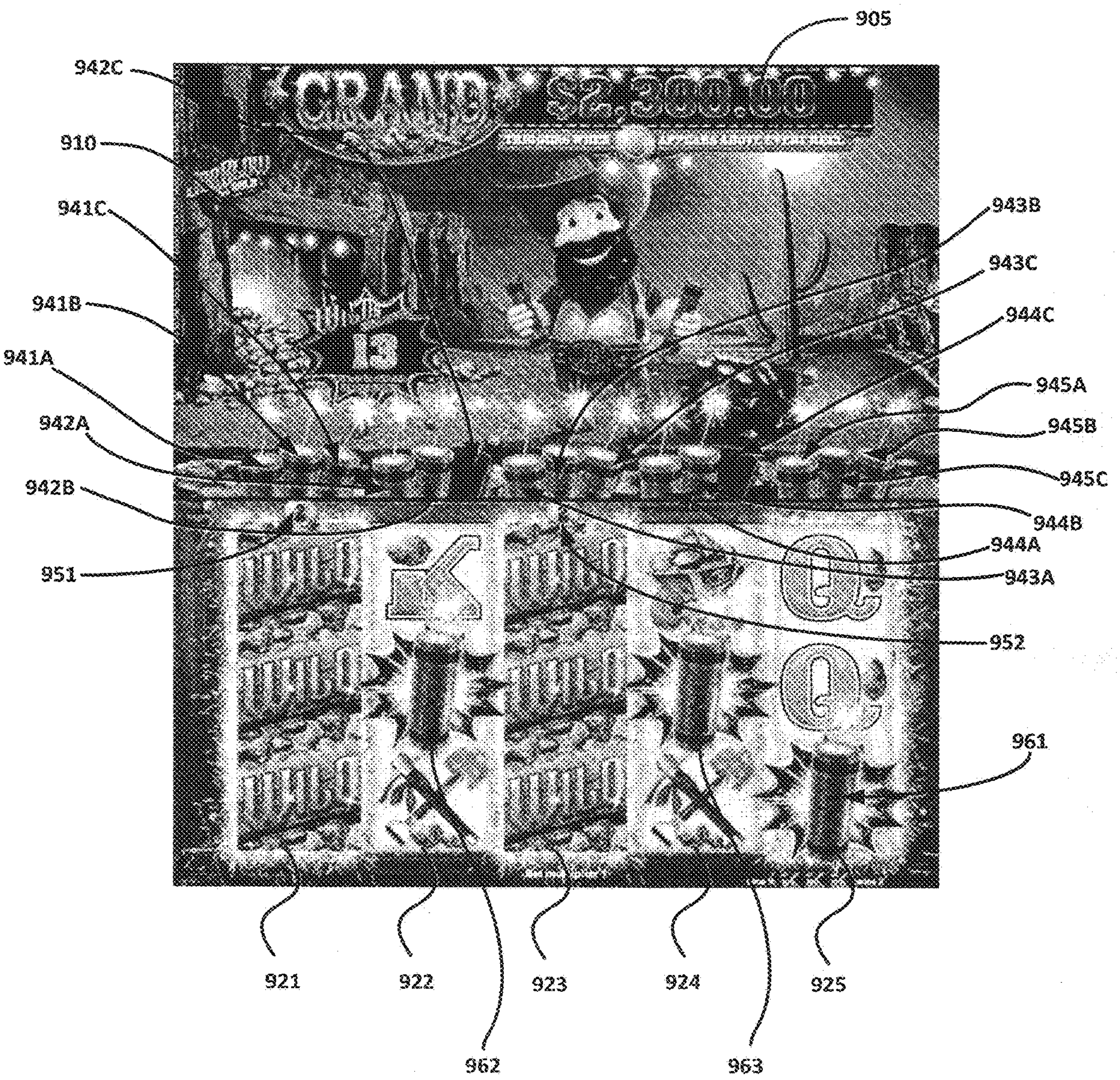
FIG. 9 is a an exemplary screen shot of an embodiment of the present disclosure.

In an embodiment, the reels are held for more than one additional game round. In the embodiment of FIG. 9, the reels are held for two additional game rounds beyond the current game round, and the number of game rounds for which the reels are held is reset if a further reel becomes wild. The number of game round remaining is maintained on held reel counter 648.

In order to implement the game, the outcome generator incorporates a symbol modifier 622B configured to change the state of the special symbols from a normal to an active state within reel data 643. In one example, special symbols are replaced within the reels with the active special symbol (for example as indicated by the golden dynamite symbol). Further, the symbol modifier determines that if an active special symbol appears on the reels, it is modified to reveal the three wild symbols in each symbol display position and displayed on display 54 under control of display controller 625. In another example, this is achieved by the symbol modifier 622B swapping the reels that are used.

Also, in order to implement the a gaming machine or device in accordance with the disclosure, the outcome evaluator includes a state updater 623A which updates a symbol collection state 647 in respect of each reel each time a special symbol in a normal state appears on the reel until sufficient symbol have been collected to change the special symbol(s) on that reel an active state. In the example, three special symbols must be collected. Further, the state updater 623A is configured to update reel states 644 of reel data 643 to a held state if an active special symbol is selected on a respective reel. The current symbol collection state 647 and reel states 644 influence the operation of the outcome generator 622. For example, it will be appreciated that once a reel is full of will symbols and is held, that reel does not require fresh symbols to be selected during the next game whether paid or free. Therefore, the symbol selector 622A will only select symbols for each of the other reels.

In an example, upon all of the reels being turned to wild symbols, the outcome evaluator 623 awards a jackpot prize through jackpot awarder 623C.

Figure 10:
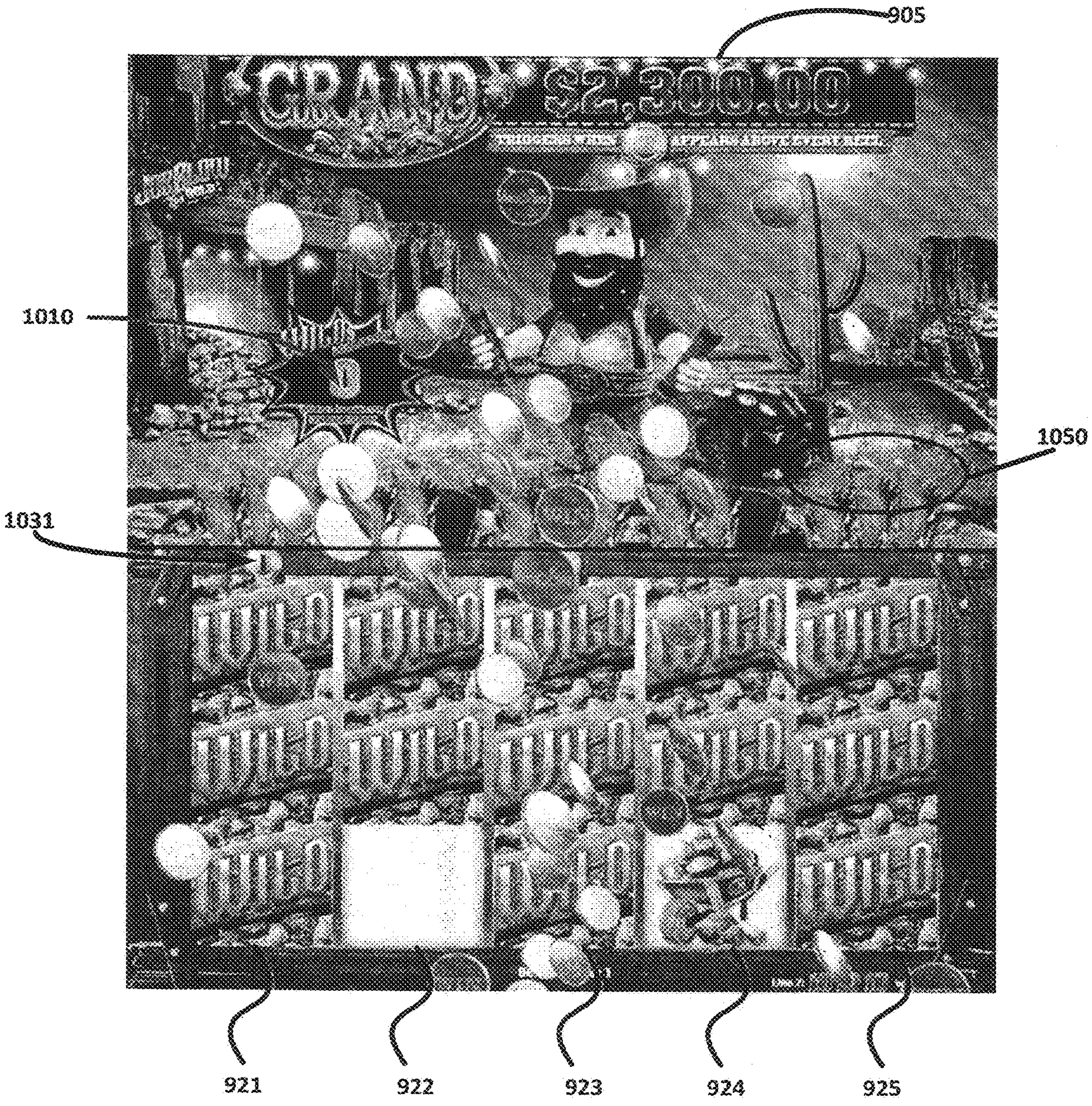
FIG. 10 is a further exemplary screen shot.

In an embodiment, described further in relation to FIG. 10, each time an outcome is generated, there is a chance that the collected symbols will be reset. To this end, the symbol re-setter 622C conducts a random determination using random number generator 621 as to whether the current symbol collection states 647 should be reset to zero. If the random number generator returns a value within a designated range, the number of wild symbols that have already been collected are immediately added to the reels as wild symbols in the current play of the game and the outcome evaluator 623 evaluates the game outcome based on pay table 642 in accordance with the wild symbols as added to the display. That is, if one wild symbol has been collected for a reel, one wild symbol is added to that reel, if two wild symbols have been collected for a reel, two wild symbols are added, etc.

Finally, in an embodiment, a feature game can be triggered based on the game outcome and the outcome evaluator 623B includes a trigger monitor that monitors for the trigger condition 646, which in this example is a defined number of a scatter symbols.

During the free games, game play continues as before with two additional features. Firstly, any awards that are paid due to the symbols being reset are doubled. Secondly, the symbol modifier 622B modifies the symbols that are used by selectively determining using a weighted table and the random number generator 621 whether to change each occurrence of a special symbol to a multiple special symbol. In the example shown in FIG. 11 as it will be described in further detail below, each special symbol can remain as one stick of dynamite or can be changed to two or three sticks of dynamite. If one of these multiple sticks of dynamite should occur, the symbol collection state 647 for that reel is updated by the number of the multiple special symbols. For example, if the symbol collection state for a particular reel was originally zero and a three dynamite symbol appeared at a symbol display position, the symbol collection state 647 of that reel will be updated to three.

Figure 7:
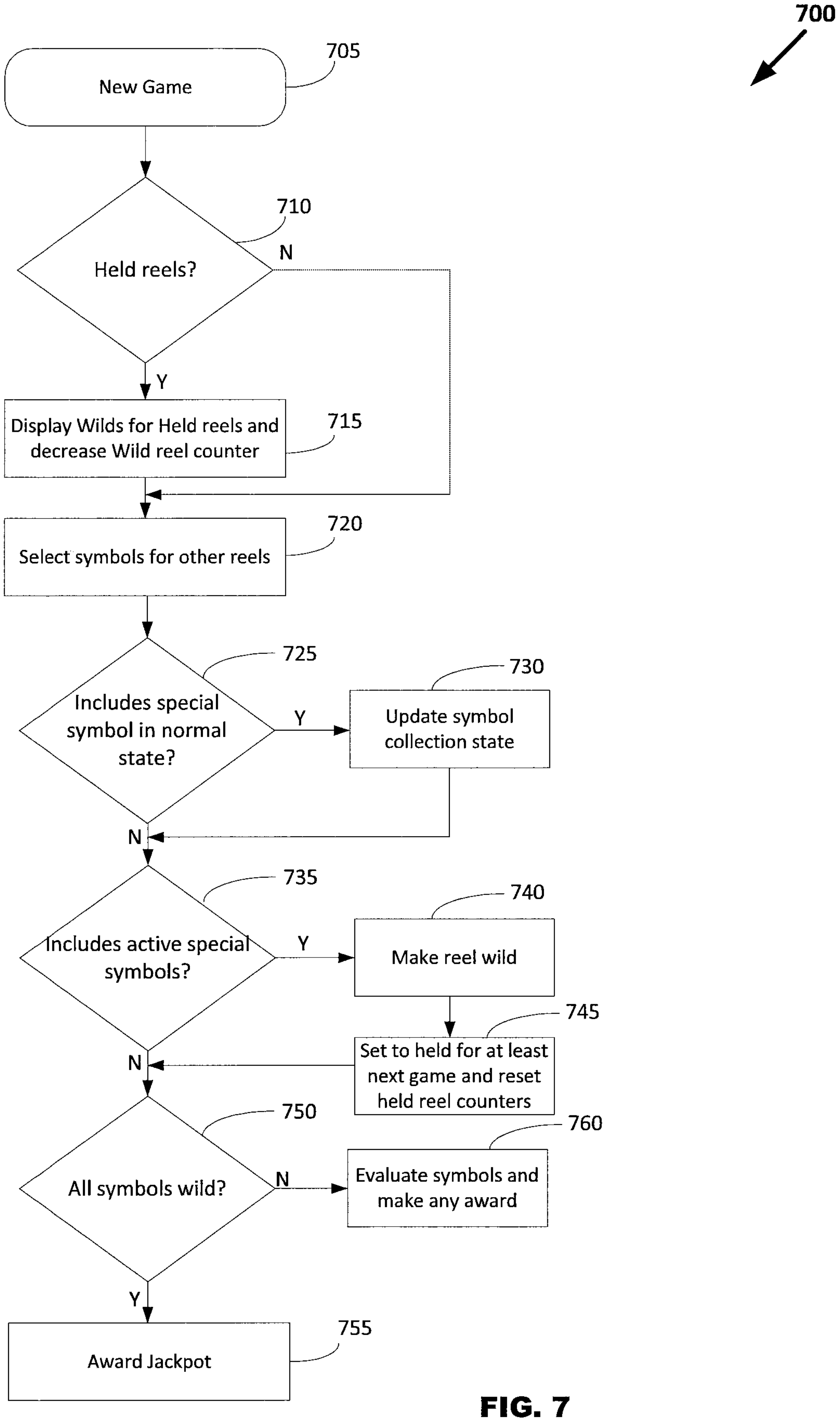
FIG. 7 is a flow chart of an embodiment.
Figure 8:
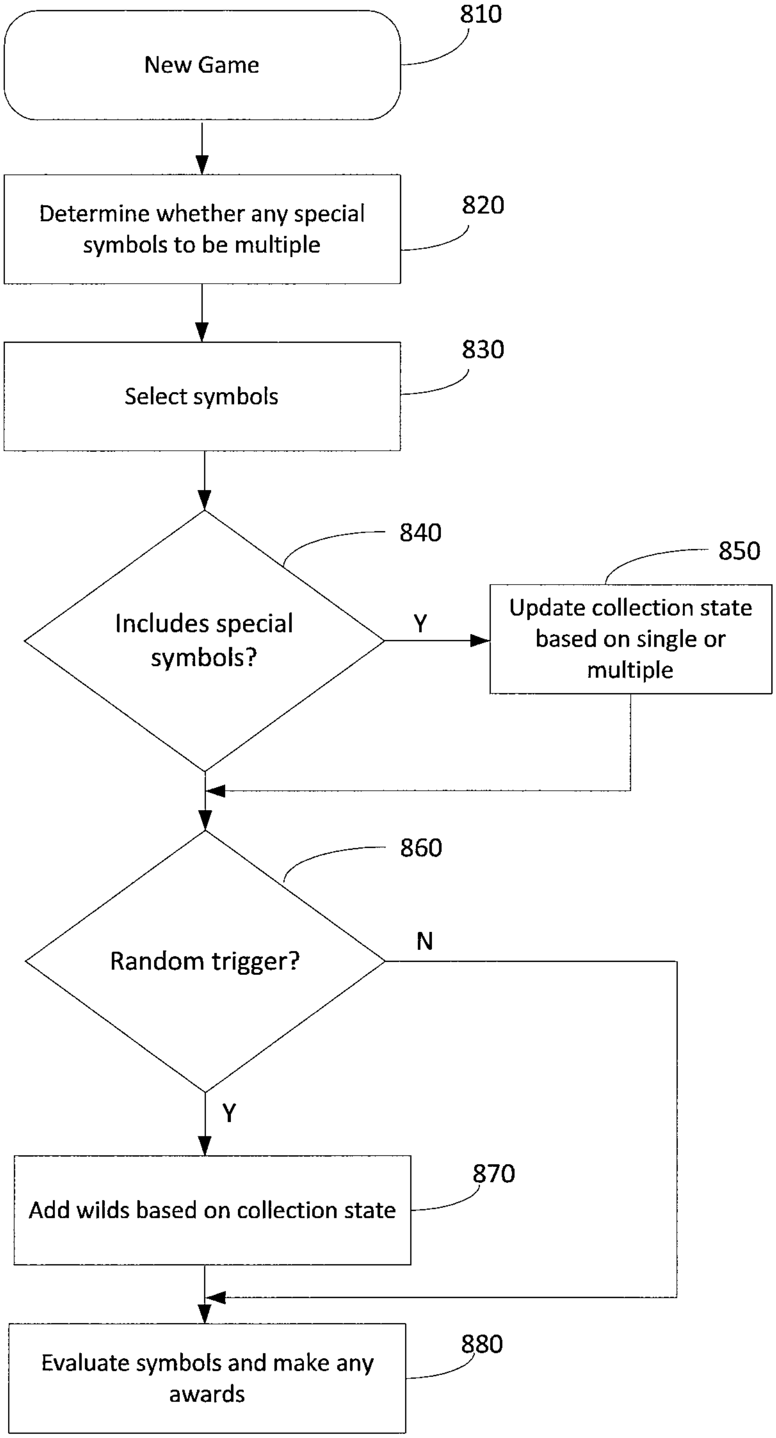
FIG. 8 is a flow chart of another embodiment.

FIG. 7 illustrates a method 700 of an embodiment. A new game is started at step 705. The method involves determining whether there are any held reels at step 710. If there are held reels, wild symbols are displayed 715 for each of the held reels. At step 720 symbols are selected for all reels which are not currently held reels. At step 725, it is determined whether any of the selected symbols includes a special symbol in a normal state and if it does, the method involves, at step 730, updating the symbol collection state 647 in respect of each such reel. At step 735, the method involves determining whether any of the reels includes an active special symbol and if it does, the method involves making the relevant reel wild at step 740. At step 745, the reel that has just been made wild is set to be held for at least the next game and the held reel counter 648 is reset for any other held reels. At step 750, it is determined whether all the symbols are wild and if they are, at step 755 a jackpot award is made. If, instead, at step 750 some of the symbols are not wild then the outcome evaluator 623 evaluates symbols based on the pay table 642 and makes any awards. Awards are made being added to the win meter or directly to the credit meter. In some examples, the award is made to the win meter and where it is large, a hand pay is initiated via the machine which requires an attendant to payout the award to the player.

FIG. 9 illustrates an example of how the game is implemented by the gaming machine 1. In the screen shot of FIG. 9, a current value of the grand jackpot 905 is shown at the top of the display.

There are five reels 921, 922, 923, 924 and 925. In the example shown in FIG. 9, two of the reels are already wild, namely reels 921 and 923 and counters 951, 952 indicate that they will be held for two more games after the current game. The current symbol collection state of each reel is indicated graphically by dynamite sticks above the reels from which it is apparent that three dynamite sticks 941A, 941B, 941C have been collected in respect of reel 921 (which has led to that reel being populated with a wild symbol) whereas only two dynamite symbols have been collected in respect of reel 922 at positions 942A and 942B while position 942C is left blank.

In the example of FIG. 9, three dynamite symbols 961, 962 and 963 have been selected in the current game round and resulted in the symbol collection states being updated. That is, symbol collection state of reel 925 has been updated to be full as indicated by items 945A, 945B and 945C. Hence, in the next game, the dynamite symbols on that reel are gold dynamite symbols (i.e. active).

FIG. 10 illustrates the aspect of the game where the symbols can be reset and that this feature involves adding symbols to the reel. As indicated in FIG. 9, thirteen wild symbols 910 have been collected. In FIG. 10, this has been reset to zero 1010 which is illustrated as the dynamite sticks exploded as indicated, for example, in area 1050 on the display. As there were previously thirteen wild symbols in FIG. 9, thirteen wild symbols have been added to the reels in FIG. 10 and the outcome evaluator 623 has determined the awards to apply on that basis.

Figure 11:
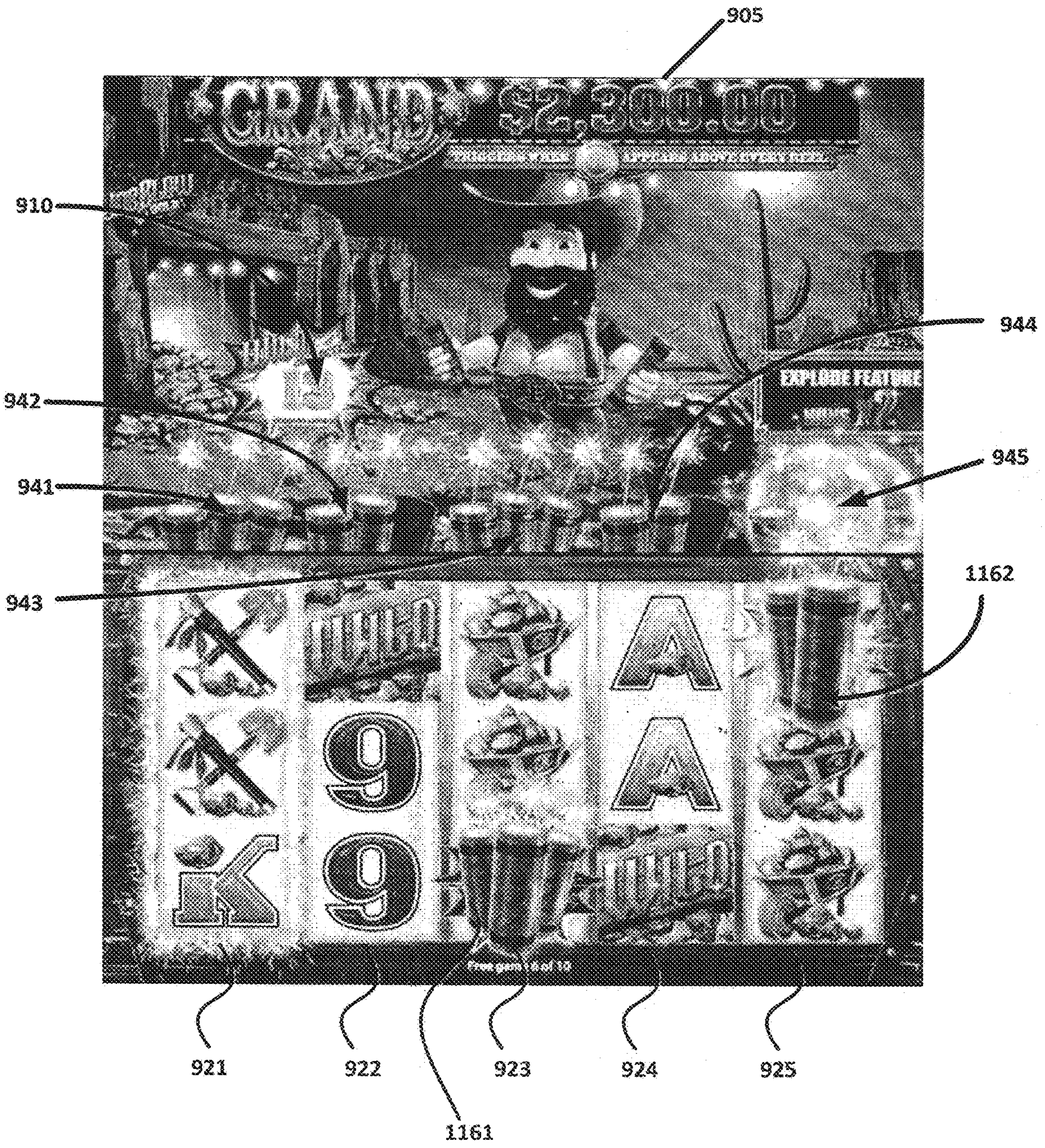
FIG. 11 is a further exemplary screen shot.

Referring to FIG. 11, there is shown an example display during the free games feature. During the free games feature, if the dynamite sticks explode, any wins are doubled. An additional aspect of this feature game is that multiple special symbols such as triple dynamite symbol 1161 or double dynamite symbol 1162 can occur on the reels. These symbols are determined at random as described above.

FIG. 11 illustrates the area around the symbol collection counter for reel 945 lighting up to show the special symbols being added to the area. Thus, during the feature game, the player can collect symbols more rapidly. The feature game is triggered by the occurrence of three or more trigger symbols in the underlying game.

Typically, a winning outcome will result in some form of award being made such as an award of credits. Such an award may never actually be physically received by a player. For example, many gaming systems provide a player with a double or nothing gamble feature, where the player can double or forfeit their credits before commencing another play of the game or cashing out. Further, as credits are fungible, once credits have been added to the credit meter it is not possible to distinguish between credits which exist because the player has input cash or the like and credits resulting from an award.

Further aspects of the method of operating a gaming machine will be apparent from the above description of the gaming machine. It will be appreciated that at least part of the method will be implemented electronically, for example, digitally by a processor executing program code such as in the above description of a game controller. In this respect, in the above description certain steps are described as being carried out by a processor m, it will be appreciated that such steps will often require a number of sub-steps to be carried out for the steps to be implemented electronically, for example due to hardware or programming limitations. For example, to carry out a step such as evaluating, determining or selecting, a processor may need to compute several values and compare those values.

As indicated above, the method may be embodied in program code. The program code could be supplied in a number of ways, for example on a tangible computer readable storage medium, such as a disc or a memory device, e.g. an EEPROM, (for example, that could replace part of memory 103) or as a data signal (for example, by transmitting it from a server). Further different parts of the program code can be executed by different devices, for example in a client server relationship. Persons skilled in the art, will appreciate that program code provides a series of instructions executable by the processor.

It will be understood to persons skilled in the art that many modifications may be made without departing from the spirit and scope of the disclosure, in particular it will be apparent that certain features of embodiments of the disclosure can be employed to form further embodiments.

It is to be understood that, if any prior art is referred to herein, such reference does not constitute an admission that the prior art forms a part of the common general knowledge in the art in any country.

In the claims which follow and in the preceding description of the disclosure, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the disclosure.

The invention claimed is:

1. A gaming machine comprising:

a display device providing a plurality of symbol display positions;

a credit mechanism operable to establish credits on a credit meter of the gaming machine;

a game play mechanism operable to place a wager from the credits established and initiate a play of a game; and a game controller comprising a processor and a memory storing a plurality of instructions, a pay table, reel data defining a plurality of reels, each reel of the plurality of reels including at least one special symbol which has an active state and a normal state, and a reel state for each of the plurality of reels, and wherein, the instructions, when executed, cause the game controller to, for the play of the game, at least:

display, on the display device, a wild symbol at each symbol display position of each reel of the plurality of reels which is in a held state for the play, select and display a plurality of symbols for each of the plurality of reels that is not in the held state for the play, in response to determining that the plurality of symbols selected for display any of the plurality of reels that is not in the held state include a special symbol in the normal state, display one or more collection symbols outside the plurality of symbol display positions to account for one or more of the special symbols collected in respect of each reel where the special symbol is collected at the plurality of symbol display positions, in response to determining that the one or more collection symbols displayed outside the plurality of symbol display positions for a respective reel that is not in the held state reaches a defined number, set each special symbol on the respective reel to be in the active state for at least a next play, in response to determining that the plurality of symbols selected for display at a reel of the plurality of reels include a plurality of special symbols in the active state, change each occurrence of the plurality of special symbols in the active state to the wild symbol at each symbol display position for the respective reel and set the reel state for the respective reel to be in the held state for at least one subsequent play, and determine an award, based on the pay table and the plurality of symbols displayed on the reels.

2. The gaming machine of claim 1, wherein the memory stores counters defining how many games each reel of the plurality of reels is to be in the held state, and the game controller resets one or more of the counters to an initial value when the reel state for the respective reel is to be in the held state.

3. The gaming machine of claim 2, wherein a respective counter for the respective reel is (i) decremented by one each time the game is played during which no reel is changed to display the wild symbol at each of the plurality of symbol display positions and (ii) reset each time the game is played where one or more reels is changed to display the wild symbol at each of the plurality of symbol display positions.

4. The gaming machine of claim 1, wherein a prize is awarded if the wild symbol occupies each of the plurality of symbol display positions of each reel.

5. The gaming machine of claim 4, wherein the prize is a jackpot.

6. The gaming machine of claim 1, wherein possible values of a symbol collection state range from zero to a number of symbol display positions on the respective reel.

7. The gaming machine of claim 6, wherein the instructions further cause the game controller to make a random determination as to whether a number of wild symbols corresponding to a number of special symbols collected at each reel is to be added to the respective reel at the symbol display positions.

8. The gaming machine of claim 1, wherein the instructions further cause the game controller to evaluate the plurality of symbols displayed on the reels after any reels have been changed to determine whether a trigger condition is met, and conduct a series of free games upon the trigger condition being met.

9. The gaming machine of claim 8, wherein the instructions further cause the game controller to determine, prior to selection of symbols, whether to modify individual occurrences of the special symbol to be multiple special symbols, whereby, upon the plurality of symbols selected for display on one of the plurality of reels during the series of free games including one or more special symbols including a multiple special symbol, the one or more collection symbols displayed for the respective reel is updated by a number of the multiple special symbols.

10. A method of operating a gaming machine, the gaming machine comprising a display device providing a plurality of symbol display positions; a credit mechanism operable to establish credits on a credit meter of the gaming machine; a game play mechanism operable to place a wager from the credits established and initiate a play of a game; and a game controller comprising a processor and a memory storing a plurality of instructions, a pay table, reel data defining at least a plurality of reels, each reel of the plurality of reels including at least one special symbol which has an active state and a normal state, and a reel state for each of the plurality of reels, and wherein, the instructions, when executed, for the play of the game, to initiate the play of the game, the method comprising:

displaying, on the display device, a wild symbol at each symbol display position of each reel of the plurality of reels which is in a held state for the play;

selecting and displaying symbols for each of the plurality of reels that is not in the held state for the play;

in response to determining that the symbols selected for display at any of the plurality of reels that is not in the held state include a special symbol in the normal state, displaying one or more collection symbols outside the plurality of symbol display positions to account for one or more of the special symbols collected in respect of each reel where the special symbol is collected at the plurality of symbol display positions;

in response to determining that the one or more collection symbols displayed outside the plurality of symbol display positions for any of the plurality of reels that is not in the held state reaches a defined number, setting each special symbol on the respective reel to be in the active state for at least a next play;

in response to determining that the symbols selected for display a reel of the plurality of reels include a plurality of special symbols in the active state, changing each occurrence of the plurality of special symbols in the active state to the wild symbol at each symbol display position for the respective reel and set the reel state for the respective reel to be in the held state for at least one subsequent play; and determining an award, based on the pay table and the symbols displayed on the reels.

11. The method of claim 10, further comprising storing, in the memory, counters defining how many games each reel of the plurality of reels is to be in the held state, and resetting one or more of the counters to an initial value when the reel state for the respective reel is set to be in the held state.

12. The method of claim 11, further comprising (i) decrementing one or more of the counters by one each time the game is played during which no reel is changed to display the wild symbol at each of the plurality of symbol display positions and (ii) resetting one or more of the counters each time the game is played where one or more reels is changed to display the wild symbol at each of the plurality of symbol display positions.

13. The method of claim 10, further comprising awarding a prize if the wild symbol occupies each of the plurality of symbol display positions of each reel.

14. The method of claim 13, wherein the prize is a jackpot.

15. The method of claim 10, wherein possible values of a symbol collection state range from zero to a number of symbol display positions on the respective reel.

16. The method of claim 15, further comprising randomly determining whether a number of wild symbols corresponding to a number of special symbols collected at each reel is to be added to the respective reel at the symbol display positions.

17. The method of claim 10, further comprising evaluating the symbols displayed on the reels after any reels have been changed to determine whether a trigger condition is met, and conducting a series of free games upon the trigger condition being met.

18. The method of claim 17, further comprising determining, prior to selection of symbols, whether to modify individual occurrences of the special symbol to be multiple special symbols, whereby, upon the symbols selected for display on one of the plurality of reels during the series of free games including one or more special symbols including a multiple special symbol, the one or more collection symbols displayed for the respective reel is updated by a number of the multiple special symbols.

* * * * *